(12) United States Patent
Seagle et al.

(10) Patent No.: US 12,094,502 B2
(45) Date of Patent: Sep. 17, 2024

(54) OFFSET EDGE OF SERVO HEADS RELATIVE TO DATA HEADS FOR SIGNAL-TO-NOISE RATIO OPTIMIZATION IN A TAPE HEAD MODULE

(71) Applicant: Western Digital Technologies, Inc., San Jose, CA (US)

(72) Inventors: David J. Seagle, Morgan Hill, CA (US); Diane L. Brown, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/227,513

(22) Filed: Jul. 28, 2023

(65) Prior Publication Data

US 2024/0282335 A1    Aug. 22, 2024

Related U.S. Application Data

(60) Provisional application No. 63/447,550, filed on Feb. 22, 2023.

(51) Int. Cl.
| | | |
|---|---|---|
| *G11B 5/48* | (2006.01) | |
| *G11B 5/008* | (2006.01) | |
| *G11B 5/187* | (2006.01) | |

(52) U.S. Cl.
CPC ........ *G11B 5/4893* (2013.01); *G11B 5/00813* (2013.01); *G11B 5/187* (2013.01)

(58) Field of Classification Search
None
See application file for complete search history.

(56) References Cited

U.S. PATENT DOCUMENTS

| | | | |
|---|---|---|---|
| 6,522,490 B1 * | 2/2003 | Cates | G11B 5/59633 360/48 |
| 7,333,291 B1 | 2/2008 | Fasen | |
| 8,154,811 B2 | 4/2012 | Barsotti et al. | |
| 8,824,083 B1 | 9/2014 | Kientz et al. | |
| 9,754,616 B2 | 9/2017 | Biskeborn et al. | |
| 10,014,014 B1 * | 7/2018 | Biskeborn | G11B 5/4893 |
| 10,199,057 B1 * | 2/2019 | Seagle | G11B 5/00826 |

(Continued)

OTHER PUBLICATIONS

Biskeborn, Robert G. et al., "Tape Head Technology", International Magnetic Tape Storage Roadmap, May 2012, pp. 1-22.

(Continued)

*Primary Examiner* — William J Klimowicz
(74) *Attorney, Agent, or Firm* — PATTERSON + SHERIDAN, LLP

(57) ABSTRACT

The present disclosure generally relates to a tape head and a tape drive including a tape head. The tape head comprises a plurality of data heads disposed at a media facing surface (MFS) and one or more servo heads disposed at the MFS. The plurality of data heads each individually have a first stripe height extending from the MFS to a back edge of a module. The one or more servo heads each individually have a second stripe height extending from the MFS towards the back edge of the module. The second stripe height is about 10% to about 75% less than the first stripe height. By making the second stripe height less than the first stripe height, the area of the servo heads is reduced while the resistance of the sensors of the servo heads is increased.

20 Claims, 7 Drawing Sheets

(56) References Cited

U.S. PATENT DOCUMENTS

| | | | |
|---|---|---|---|
| 10,395,676 B2* | 8/2019 | Biskeborn | G11B 5/00826 |
| 11,227,628 B1* | 1/2022 | Seagle | G11B 5/3948 |
| 2004/0001277 A1 | 1/2004 | Chliwnyj et al. | |
| 2006/0007579 A1 | 1/2006 | Kirschenbaum et al. | |
| 2008/0068750 A1* | 3/2008 | Biskeborn | G11B 5/29 |
| 2015/0255092 A1* | 9/2015 | Macken | G11B 5/3948 |
| | | | 360/324 |
| 2015/0279397 A1* | 10/2015 | Herget | G11B 5/584 |
| | | | 360/48 |
| 2017/0309300 A1 | 10/2017 | Rudy et al. | |
| 2018/0185978 A1* | 7/2018 | Smith | G11B 5/3173 |

OTHER PUBLICATIONS

Biskeborn, Robert G. et al., "TMR Tape Drive for a 15 TB Cartridge", Magnetism and Magnetic Materials, vol. 8, Issue 5, Dec. 2017, pp. 1-21, Last Accessed Jul. 1, 2024, <https://doi.org/10.1063/1.5007788>.

* cited by examiner

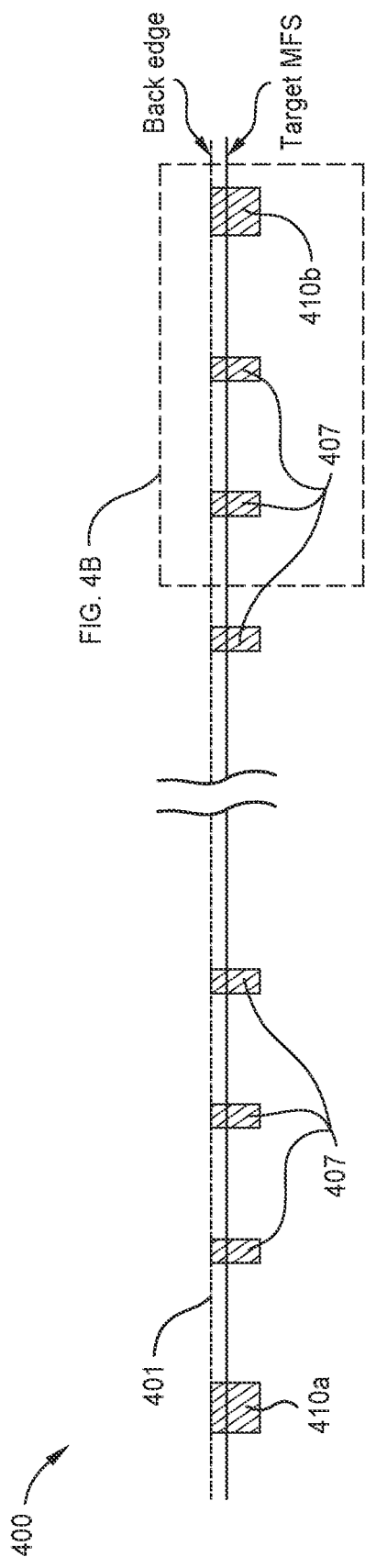
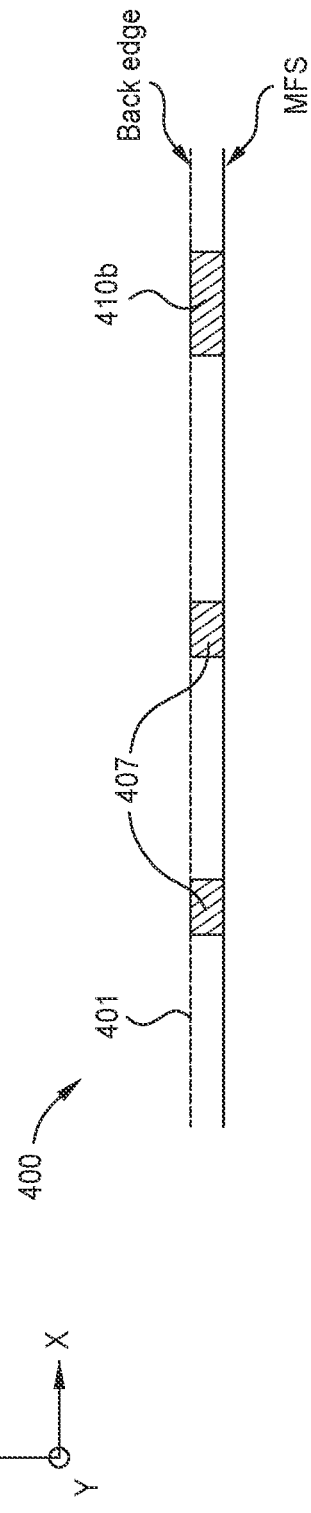
FIG. 4A (Prior Art)
FIG. 4B (Prior Art)

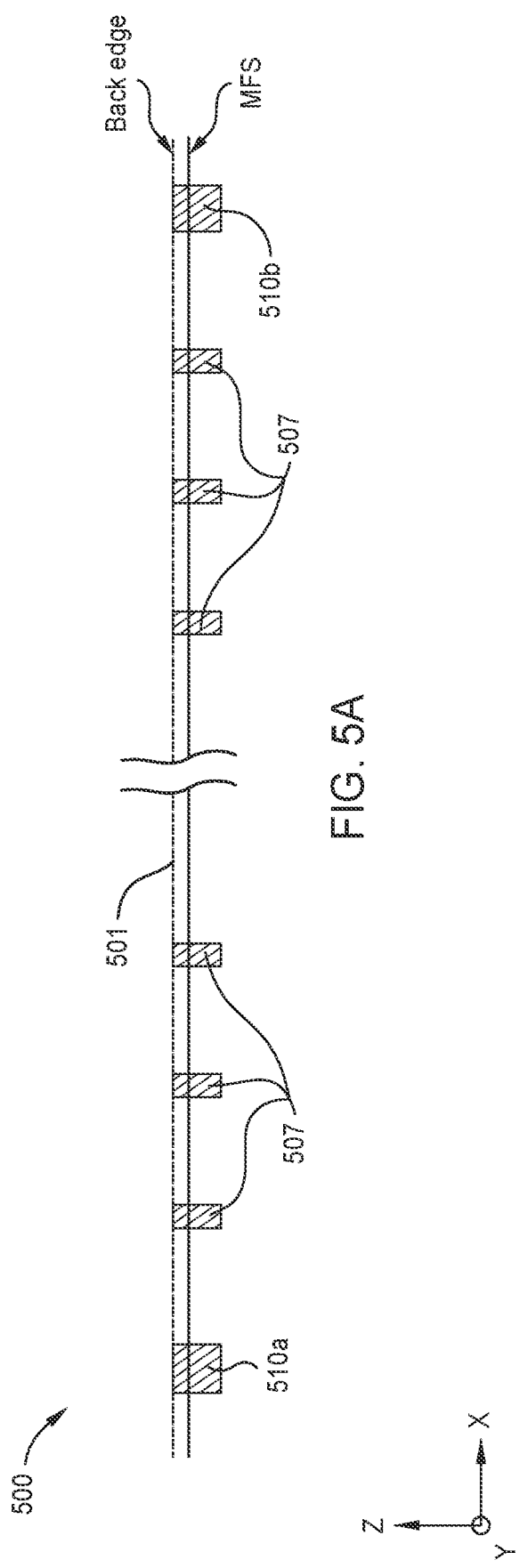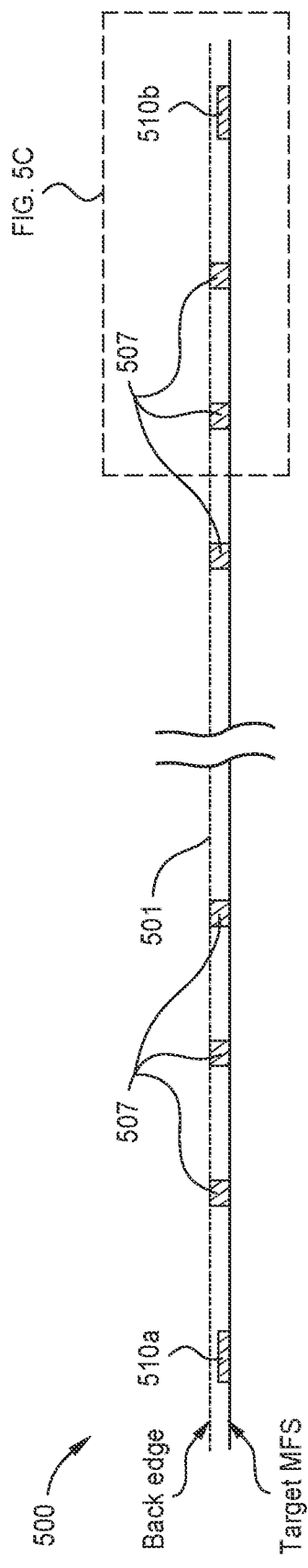

OFFSET EDGE OF SERVO HEADS RELATIVE TO DATA HEADS FOR SIGNAL-TO-NOISE RATIO OPTIMIZATION IN A TAPE HEAD MODULE

CROSS-REFERENCE TO RELATED APPLICATIONS

This application claims benefit of U.S. provisional patent application Ser. No. 63/447,550, filed Feb. 22, 2023, which is herein incorporated by reference.

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media. A tape head typically includes multiple write and read transducers serving as data write and read heads, as well as one or more read transducers serving as servo heads to read a servo track which signal is used to accurately position the write transducers and the read transducers.

Data read heads and servo heads are typically read transducers in the form of magnetoresistive sensors. For any current-perpendicular to plane (CPP) sensor, such as TMR, the resistance (and thus the electronic signal-to-noise ratio (SNR)) is inversely related to the area of the sensor. The SNR of the read transducers increases with sensor resistance as the area allows more signal relative to electronics noise, but there is an electronic limit to sensor resistance before the SNR again degrades-typically around 200 Ohms.

SUMMARY OF THE DISCLOSURE

Increasing track density to provide higher capacity tape storage requires reducing the widths of the data tracks, such as to a track width of about 100 nm, which in turn requires the data sensor resistivity to be reduced to maintain optimum resistance. However, servo tracks often need to have a track width of about 2,000 nm to average out servo media noise. In conventional tape head manufacturing, it is convenient and cost effective to use one sensor deposition for both data and servo sensor elements. This technique ties the design of the servo sensor elements to the data sensor elements even as the track width requirements diverge. Trying to maintain optimum servo head sensor resistance by reducing the track width of the servo tracks results in the servo heads not reading a sufficiently wide width of the servo tracks, increasing servo media noise and reducing media SNR. On the other hand, maintaining a 2,000 nm servo track width leads to a sensor design that reduces the sensor's resistance, reducing the electronic SNR.

The present disclosure generally relates to a tape head and a tape drive including a tape head. The tape head comprises a plurality of data heads disposed at a media facing surface (MFS) and one or more servo heads disposed at the MFS. The plurality of data heads each individually have a first stripe height extending from the MFS to a back edge of a module. The one or more servo heads each individually has a second stripe height extending from the MFS towards the back edge of the module. The second stripe height is about 10% to about 75% less than the first stripe height. By making the second stripe height less than the first stripe height, the area of the servo heads is reduced while the resistance of the sensors of the servo heads is increased. This enables the servo and data sensors to be fabricated through common steps, while allowing the servo sensor to have its own optimized electronic SNR and media SNR.

In one embodiment, a tape head comprises a plurality of data heads, the plurality of data heads each individually comprising a magnetoresistive sensor, wherein the plurality of data heads each individually has a first stripe height extending from a media facing surface to a back edge of a module, and one or more servo heads disposed adjacent to the plurality of data heads, the one or more servo heads each individually having a second stripe height extending from the media facing surface towards the back edge of the module, wherein the second stripe height is about 10% to about 75% less than the first stripe height.

In another embodiment, a tape head comprises a plurality of write transducers disposed in a first row, the plurality of write transducers each individually having a first stripe height extending from a media facing surface to a back edge of a module of about 100 nm to about 125 nm, a plurality of read transducers disposed in a second row parallel to the first row, the plurality of read transducers each individually comprising a current-perpendicular to plane (CPP) sensor, wherein each of the plurality of read transducers individually has the first stripe height, and two or more servo heads disposed in the second row, the two or more servo heads each individually having a second stripe height extending from the media facing surface towards the back edge of the module, wherein the second stripe height is about 10 nm to about 75 nm.

In yet another embodiment, a tape head comprises a plurality of write transducers disposed in a first row, the plurality of write transducers each individually having a first stripe height extending from a media facing surface to a back edge of a module, a plurality of read transducers disposed in a second row parallel to the first row, the plurality of read transducers each individually comprising a current-perpendicular to plane (CPP) sensor, wherein each of the plurality of read transducers individually has the first stripe height, one or more first servo heads disposed at a first end of the second row, the one or more first more servo heads each individually having a second stripe height extending from the media facing surface towards the back edge of the module, wherein the first stripe height is about 10% to about 75% greater than the second stripe height, and one or more second servo heads disposed at a second end of the second row opposite the first end, the one or more second more servo heads each individually having the second stripe height.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate a wafer planar view of a conventional tape head module.

FIGS. 5A-5C illustrate a tape head module, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape drive including a tape head. The tape head comprises a plurality of data heads disposed at a media facing surface (MFS) and one or more servo heads disposed at the MFS. The plurality of data heads each individually have a first stripe height extending from the MFS to a back edge of a module. The one or more servo heads each individually have a second stripe height extending from the MFS towards the back edge of the module. The second stripe height is about 10% to about 75% less than the first stripe height. By making the second stripe height half the first stripe height, the area of the servo heads is reduced while the resistance of the servo readers of the servo heads is increased.

Figure 1A:
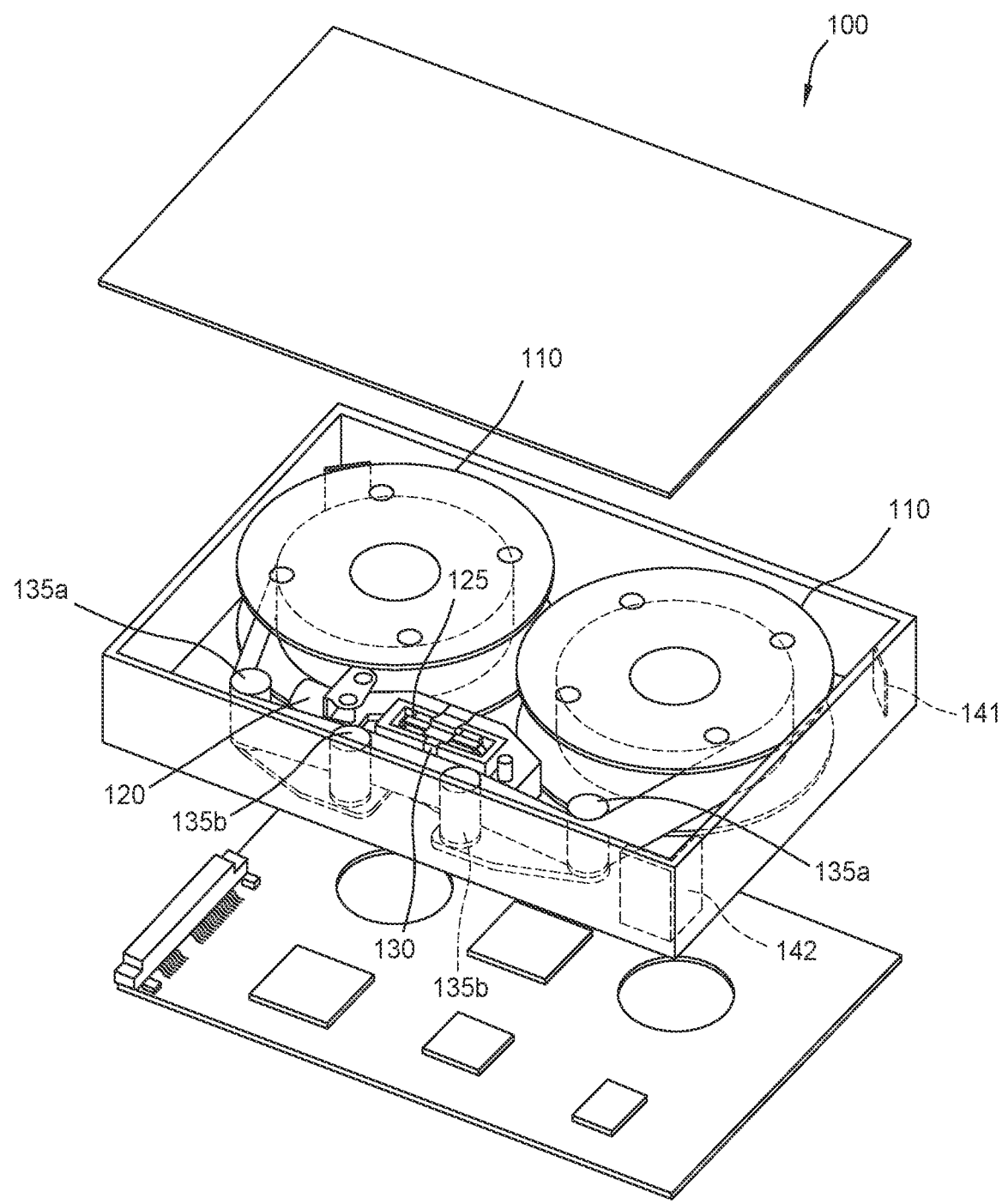
FIGS. 1A-1C illustrate a perspective exploded view, a simplified top down, and side profile view of a tape embedded drive, in accordance with some embodiments.
Figure 1B:
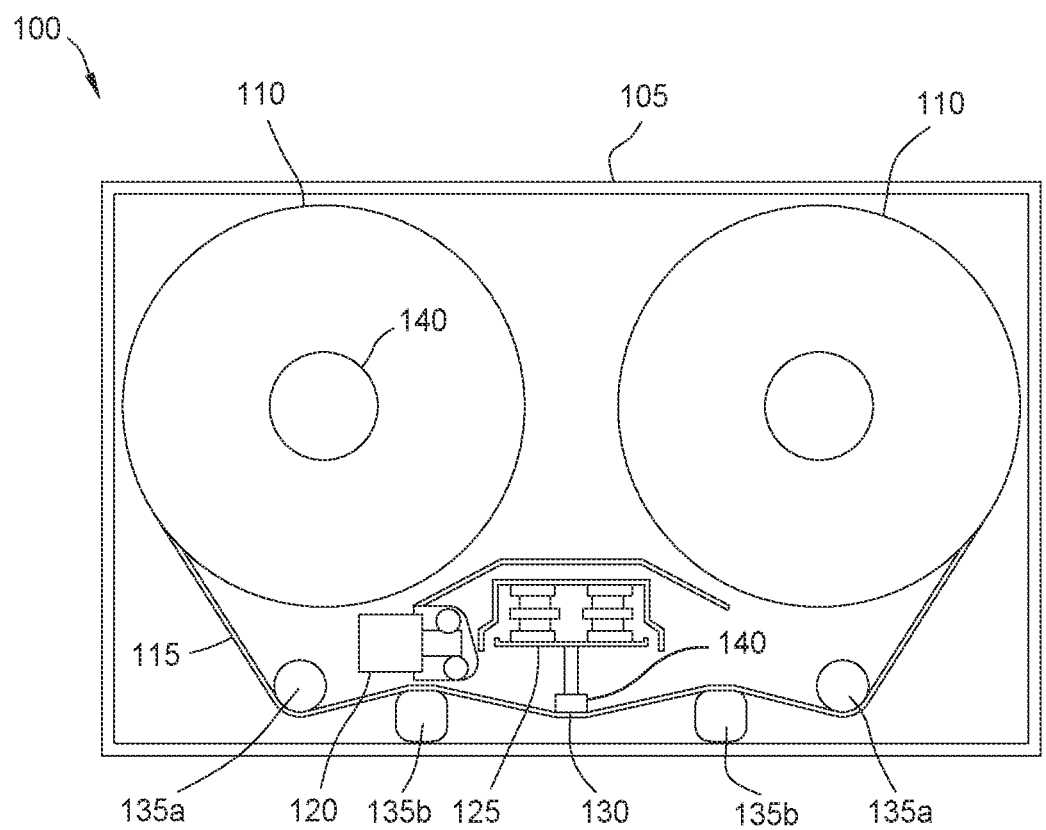
Figure 1C:
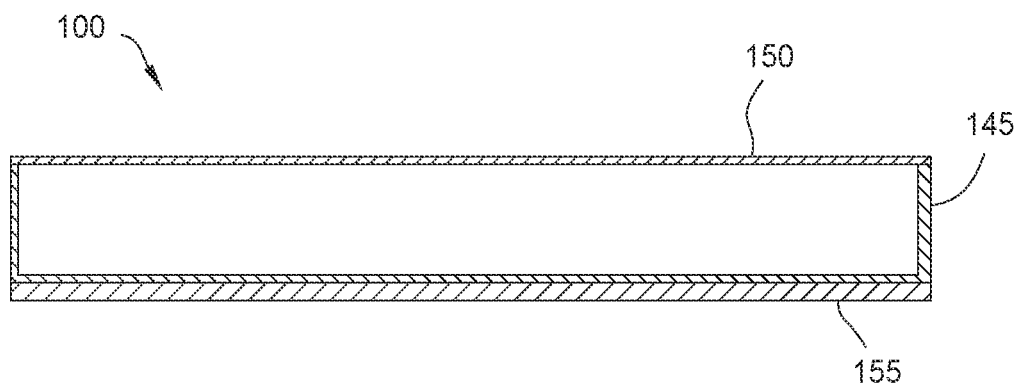

FIGS. 1A-1C illustrate a perspective exploded view, a simplified top down, and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b.

In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may no longer be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape embedded drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
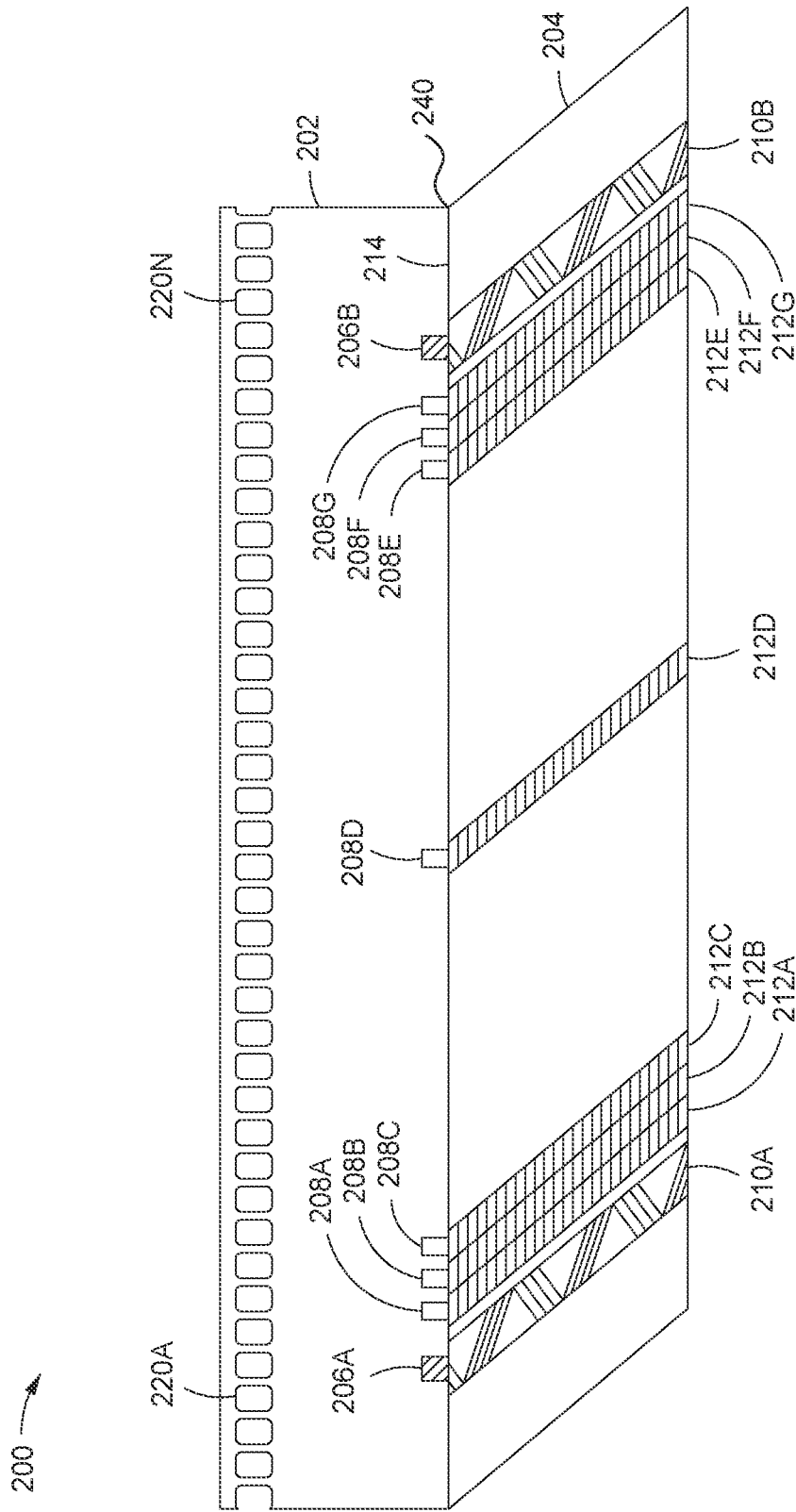
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
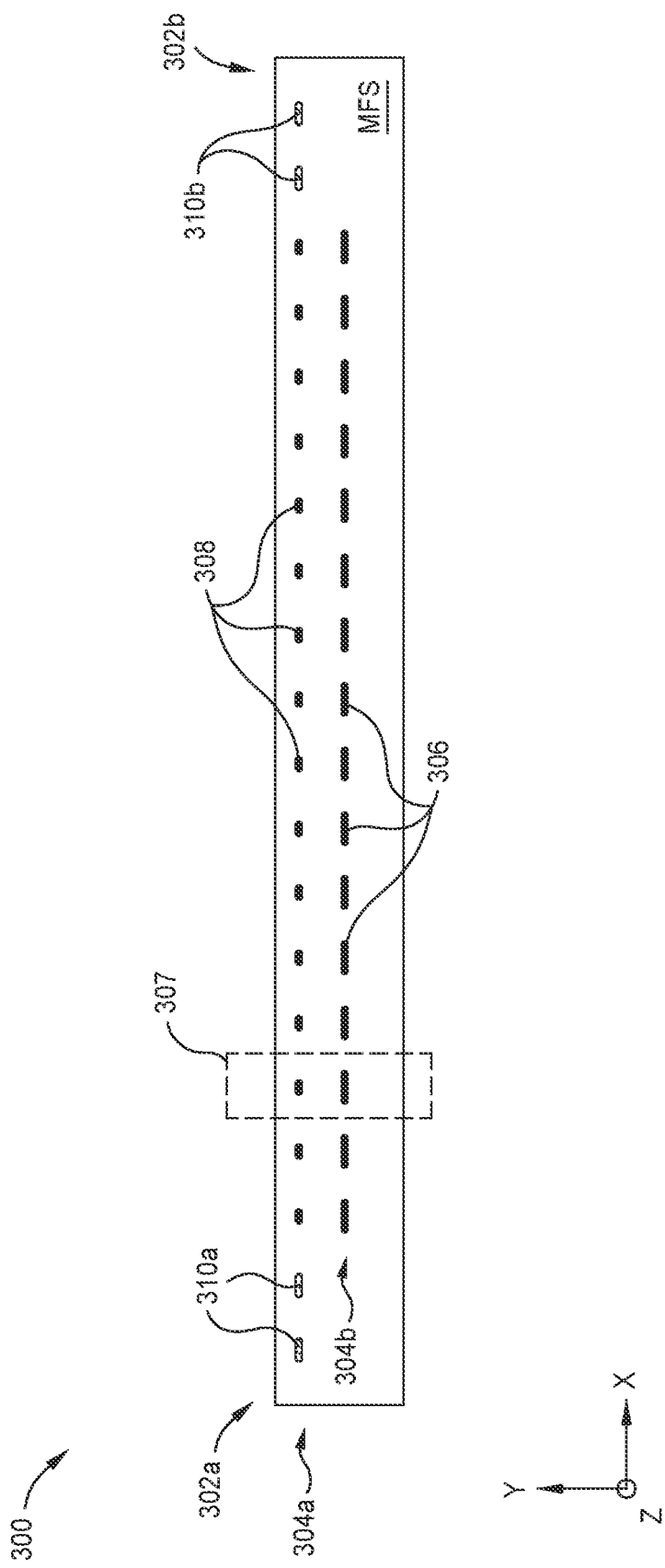
FIG. 3 illustrates a media facing (MFS) view of a tape head module, according to one embodiment.

FIG. 3 illustrates a MFS view of a tape head module 300, according to one embodiment. The tape head module 300 may be utilized within a tape drive comprising a controller, such as the TED or tape drive 100 of FIG. 1A. The tape head module 300 may be the tape head module 200 of FIG. 2.

The tape head module 300 comprises a plurality of read transducers 308 disposed in a first row 304a, and a plurality of write transducers 306 disposed in a second row 304b parallel to the first row 304a. The read transducers 308 and the write transducers 306 may each individually be the data heads 208A-208G of FIG. 2. One or more read transducers 308 and one or more write transducers 306 may be collectively referred to herein as one or more data heads 307. The plurality of write transducers 306 may be referred to herein as writers 306, and the plurality of read transducers may be referred to herein as readers 308. The plurality of data heads 307 comprise a sensor, such as a tunneling magnetoresistive (TMR) current-perpendicular to plane (CPP) sensor. In some embodiments, the read transducers 308 each comprises a TMR-CPP sensor.

The first row 304a and the second row 304b are offset in the y-direction (down-track direction). One or more first servo readers 310a are disposed at a first end 302a of the first row 304a adjacent to the readers 308, and one or more second servo readers 310b are disposed at a second end 302b of the first row 304a opposite the first end 302a. While two first servo readers 310a and two second servo readers 310b are shown, any number of first and second servo readers 310a, 310b may be included.

The plurality of readers 308 are sandwiched between one or more first servo readers 310a and the one or more second servo readers 310b. The one or more first servo readers 310a and the one or more second servo readers 310b are aligned with the readers 308 in the first row 304a. Additionally, the one or more first servo readers 310a and the one or more second servo readers 310b are disposed at the MFS.

FIGS. 4A and 4B illustrate forming a conventional tape head module 400. As shown in FIG. 4A, a plurality of data heads 407, one or more first servo readers 410a, and one or more second servo readers 410b are formed on a substrate, module, or wafer 401. The data heads 407 may be read transducers and/or write transducers. The back edge of the module 401 or data heads 407 is opposite the MFS.

Upon forming the data heads 407 and the first and second servo readers 410a, 410b, a portion of each of the data heads 407 and the first and second servo readers 410a, 410b are milled or removed to form the back edge relative to the MFS, as shown in FIG. 4B. Each of the data heads 407, the first servo readers 410a, and the second servo readers 410b extend from the back edge of the module 401 to the MFS, and thus, have a same stripe height in the z-direction of about 100 nm.

While the data heads 407 have a high resistance and strong signal during operation, the servo readers 410a, 410b have a low resistance, and thus, a weak signal. If the servo readers 410a, 410b and data heads 407 are deposited at the same time with the same sensor, the servo readers 410a, 410b will have a lower amplitude and lower SNR. In addition, there is an electronic upper limit on the data head 407 resistance-too high resistance also reduces the SNR. One possibility to bring up the SNR of the servo readers 410a, 410b is by building servo readers 410a, 410b and data heads 407 independently with separate depositions of sensor material. However, this requires acute alignment of the two back edges and doubles the cost of the wafer manufacture.

Figure 5C:
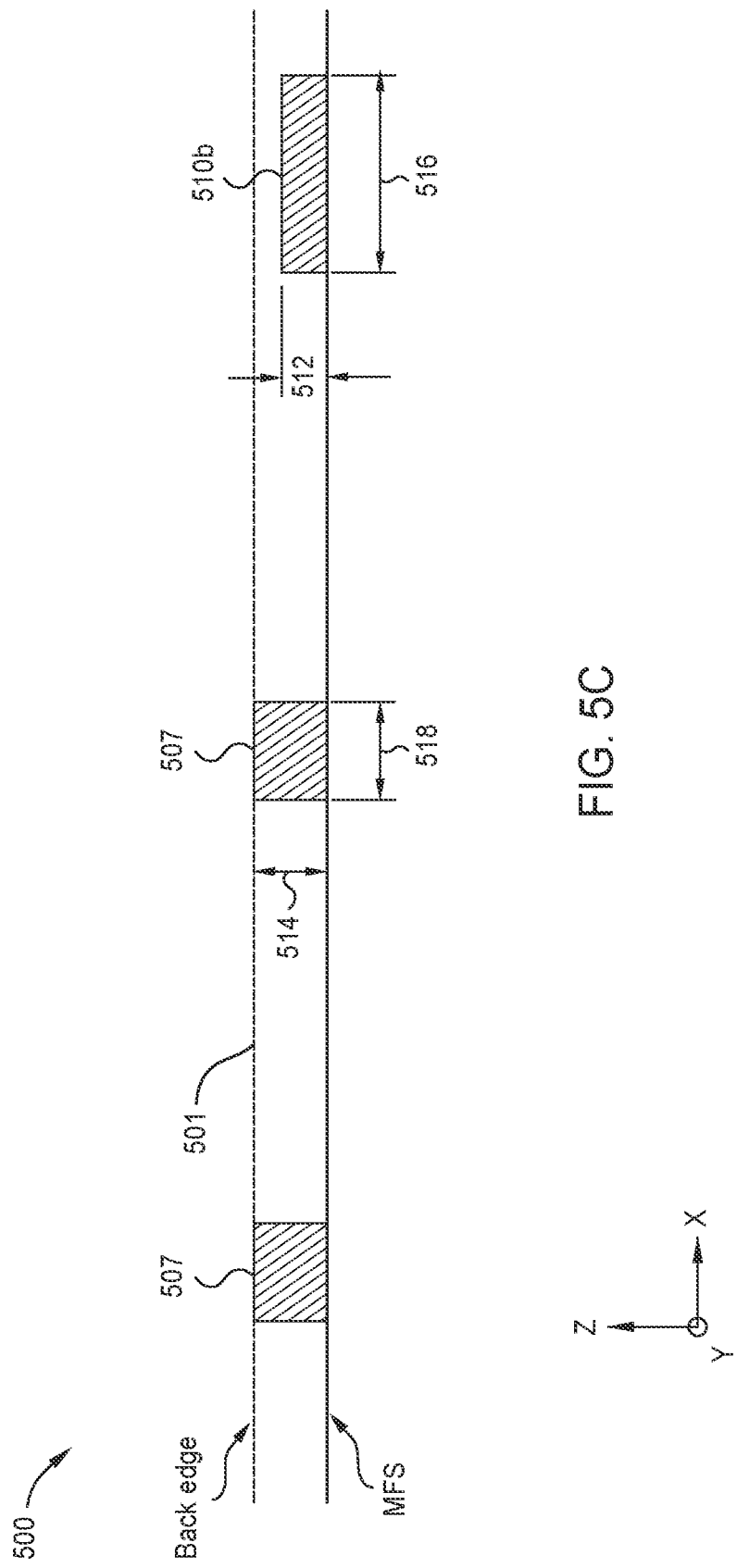

Disclosed below in FIGS. 5A-5C is a superior alternative, where both servo readers and data heads are simultaneously built, but with the back edge of the servo readers moved closer to the MFS by embedding a servo/data offset in the photolithography mask used to simultaneously define both back edges during wafer manufacture. As such, the area is reduced, and for a CPP device, the resistance of the servo readers or elements is increased while maintaining the resistance of the data heads or elements. Without such a correction, the servo readers are not as capable of keeping the data array on track, limiting the maximum track density, and thus, the data capacity of the drive or cartridge.

FIGS. 5A-5C illustrate forming a tape head module 500, according to one embodiment. FIG. 5A illustrates the tape head module 500 before the MFS is formed, FIG. 5B illustrates the tape head module 500 after the MFS is lapped or formed, and FIG. 5C illustrates a close up view of a portion of FIG. 5B. The tape head module 500 may be utilized within a tape drive comprising a controller, such as the TED or tape drive 100 of FIG. 1A. The tape head module 500 may be the tape head module 200 of FIG. 2. The tape head module 500 may be referred to herein as a tape head 500.

As shown in FIG. 5A, a plurality of data heads 507, one or more first servo heads or first servo readers 510a, and one or more second servo heads or second servo readers 510b are formed on a substrate, module, or wafer 501. The plurality of data heads 507 each individually comprises a CPP sensor, such as a TMR-CPP sensor. The back edge of the module 501 is opposite the MFS. The plurality of data heads 507 are disposed on the back edge of the module 501. However, the first and second servo readers 510a, 510b are not disposed on the back edge of the module 501. Rather, the first and second servo readers 510a, 510b are offset from the back edge of the module 501, which can be achieved by utilizing a photolithography mask during formation.

In some embodiments, the data heads 507 are the data heads 307 of FIG. 3 and/or the data heads 208A-208G of FIG. 2. The data heads 507 may be the read transducers 308 of FIG. 3 and/or the write transducers 306 of FIG. 3. In some embodiments, the plurality of read transducers of the data heads 507 each comprises a CPP sensor. The one or more first servo readers 510a may be the first servo readers 310a of FIG. 3, and the one or more second servo readers 510b may be the second servo readers 310b of FIG. 3. Additionally, while one first servo reader 510a and one second servo reader 510b is shown, the tape head module 500 may include any number of first and second servo readers 510a, 510b.

Upon forming the data heads 507 and the first and second servo readers 510a, 510b, a portion of each of the data heads 507 and the first and second servo readers 510a, 510b are milled, lapped, or removed to form the MFS, as shown in FIG. 5B. The first and second servo readers 510a, 510b and the data heads 507 are disposed at the MFS. Upon forming the MFS, the data heads 507 extend from the back edge of the module 501 to the MFS, whereas the first and second servo readers 510a, 510b are offset from the back edge of the module 501.

As shown in FIG. 5C, each of the first and second servo readers 510a, 510b have a first stripe height 512 in the z-direction that is less than a second stripe height 514 of the data heads 507. The first stripe height 512 of the first and second servo readers 510a, 510b may be about 10 nm to about 75 nm. The second stripe height 514 of the data heads 507 may be about 100 nm to about 125 nm. Thus, the first and second servo readers 510a, 510b have a first stripe height 512 that is about 10% to about 75% less than the second stripe height 514 of the data heads 507. However, the first and second servo readers 510a, 510b have a first track width 516 in the x-direction greater than a second track width 518 of the data heads 507. The first track width 516 is about 2,000 nm and the second track width 518 is about 300 nm or less.

By making the servo readers 510a, 510b have a first stripe height 512 about 10% to about 75% smaller than the second stripe height 514 of the data heads 507, the area of the servo readers 510a, 510b is reduced while the resistance of the servo readers 510, 510b increases up to 10×, allowing the resistivity of the sensor deposited to be smaller. Thus both servo and data heads can have high signal to media noise and high signal to electronic noise. As such, the amplitude of the servo readers 510a, 510b is increased without affecting the amplitude and signal of the data heads 507, and the tape head module 500 is able to write data to and read data from smaller tracks having a higher track density.

In one embodiment, a tape head comprises a plurality of data heads, the plurality of data heads each individually comprising a magnetoresistive sensor, wherein the plurality of data heads each individually has a first stripe height extending from a media facing surface to a back edge of a module, and one or more servo heads disposed adjacent to the plurality of data heads, the one or more servo heads each individually having a second stripe height extending from the media facing surface towards the back edge of the module, wherein the second stripe height is about 10% to about 75% less than the first stripe height.

The first stripe height is about 100 nm to about 125 nm, and the second stripe height is about 10 nm to about 75 nm. Each of the plurality of data heads comprises a write transducer and a read transducer. The read transducer of each data head comprises the magnetoresistive sensor. The magnetoresistive sensor is a current-perpendicular to plane (CPP) sensor. The CPP sensor is a tunneling magnetoresistive (TMR) CPP sensor. The plurality of data heads have a first track width, and wherein the one or more servo heads have a second track width greater than the first track width. A tape drive comprises the tape head.

In another embodiment, a tape head comprises a plurality of write transducers disposed in a first row, the plurality of write transducers each individually having a first stripe height extending from a media facing surface to a back edge of a module of about 100 nm to about 125 nm, a plurality of read transducers disposed in a second row parallel to the first row, the plurality of read transducers each individually comprising a current-perpendicular to plane (CPP) sensor, wherein each of the plurality of read transducers individually has the first stripe height, and two or more servo heads disposed in the second row, the two or more servo heads each individually having a second stripe height extending from the media facing surface towards the back edge of the module, wherein the second stripe height is about 10 nm to about 75 nm.

The two or more servo heads are offset from the back edge of the module by about 10 nm to about 75 nm. The CPP sensor is a tunneling magnetoresistive (TMR) CPP sensor. At least one servo head of the two or more servo heads is disposed at a first end of the second row, and at least one servo head of the two or more servo heads is disposed at a second end of the second row opposite the first end. The first stripe height is about 10% to about 75% greater than the second stripe height. The plurality of write transducers, the plurality of read transducers, and the two or more servo heads are disposed at the media facing surface. A tape drive comprises the tape head.

In yet another embodiment, a tape head comprises a plurality of write transducers disposed in a first row, the plurality of write transducers each individually having a first stripe height extending from a media facing surface to a back edge of a module, a plurality of read transducers disposed in a second row parallel to the first row, the plurality of read transducers each individually comprising a current-perpendicular to plane (CPP) sensor, wherein each of the plurality of read transducers individually has the first stripe height, one or more first servo heads disposed at a first end of the second row, the one or more first more servo heads each individually having a second stripe height extending from the media facing surface towards the back edge of the module, wherein the first stripe height is about 10% to about 75% greater than the second stripe height, and one or more second servo heads disposed at a second end of the second row opposite the first end, the one or more second more servo heads each individually having the second stripe height.

The first stripe height is about 100 nm to about 125 nm, and the second stripe height is about 10 nm to about 75 nm. The CPP sensor is a tunneling magnetoresistive (TMR) CPP sensor. The one or more first servo heads and the one or more second servo heads are each individually offset from the back edge of the module by about 10 nm to about 75 nm. The plurality of write transducers, the plurality of read transducers, the one or more first servo heads, and the one or more second servo heads are disposed at the media facing surface, and wherein the plurality of write transducers and the plurality of read transducers each individually have a first track width. The one or more first servo heads and the one or more second servo heads each individually have a second track width greater than the first track width. A tape drive comprises the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
  a plurality of data heads, the plurality of data heads each individually comprising a magnetoresistive sensor, wherein the plurality of data heads each individually has a first stripe height extending from a media facing surface to a back edge of a module; and
  one or more servo heads disposed adjacent to the plurality of data heads, the one or more servo heads each individually having a second stripe height extending from the media facing surface towards the back edge of the module, wherein the second stripe height is about 10% to about 75% less than the first stripe height.

2. The tape head of claim 1, wherein the first stripe height is about 100 nm to about 125 nm, and wherein the second stripe height is about 10 nm to about 75 nm.

3. The tape head of claim 1, wherein each of the plurality of data heads comprises a write transducer and a read transducer.

4. The tape head of claim 3, wherein the read transducer of each data head comprises the magnetoresistive sensor, and wherein the magnetoresistive sensor is a current-perpendicular-to-plane (CPP) sensor.

5. The tape head of claim 1, wherein the magnetoresistive sensor is a tunneling magnetoresistive (TMR) current-perpendicular-to-plane (CPP) sensor.

6. The tape head of claim 1, wherein the plurality of data heads have a first track width, and wherein the one or more servo heads have a second track width greater than the first track width.

7. A tape drive comprising the tape head of claim 1.

8. A tape head, comprising:
  a plurality of write transducers disposed in a first row, the plurality of write transducers each individually having a first stripe height extending from a media facing surface to a back edge of a module of about 100 nm to about 125 nm;

a plurality of read transducers disposed in a second row parallel to the first row, the plurality of read transducers each individually comprising a current-perpendicular-to-plane (CPP) sensor, wherein each of the plurality of read transducers individually has the first stripe height; and two or more servo heads disposed in the second row, the two or more servo heads each individually having a second stripe height extending from the media facing surface towards the back edge of the module, wherein the second stripe height is about 10 nm to about 75 nm.

9. The tape head of claim 8, wherein the two or more servo heads are offset from the back edge of the module by about 10 nm to about 75 nm.

10. The tape head of claim 8, wherein the CPP sensor is a tunneling magnetoresistive (TMR) CPP sensor.

11. The tape head of claim 8, wherein at least one servo head of the two or more servo heads is disposed at a first end of the second row, and at least one servo head of the two or more servo heads is disposed at a second end of the second row opposite the first end.

12. The tape head of claim 8, wherein the first stripe height is about 10% to about 75% greater than the second stripe height.

13. The tape head of claim 8, wherein the plurality of write transducers, the plurality of read transducers, and the two or more servo heads are disposed at the media facing surface.

14. A tape drive comprising the tape head of claim 8.

15. A tape head, comprising:

a plurality of write transducers disposed in a first row, the plurality of write transducers each individually having a first stripe height extending from a media facing surface to a back edge of a module;

a plurality of read transducers disposed in a second row parallel to the first row, the plurality of read transducers each individually comprising a current-perpendicular-to-plane (CPP) sensor, wherein each of the plurality of read transducers individually has the first stripe height;

one or more first servo heads disposed at a first end of the second row, the one or more first more servo heads each individually having a second stripe height extending from the media facing surface towards the back edge of the module, wherein the first stripe height is about 10% to about 75% greater than the second stripe height; and one or more second servo heads disposed at a second end of the second row opposite the first end, the one or more second more servo heads each individually having the second stripe height.

16. The tape head of claim 15, wherein the first stripe height is about 100 nm to about 125 nm, and wherein the second stripe height is about 10 nm to about 75 nm.

17. The tape head of claim 15, wherein the CPP sensor is a tunneling magnetoresistive (TMR) CPP sensor.

18. The tape head of claim 15, wherein the one or more first servo heads and the one or more second servo heads are each individually offset from the back edge of the module by about 10 nm to about 75 nm.

19. The tape head of claim 15, wherein the plurality of write transducers, the plurality of read transducers, the one or more first servo heads, and the one or more second servo heads are disposed at the media facing surface, and wherein the plurality of write transducers and the plurality of read transducers each individually have a first track width, and wherein the one or more first servo heads and the one or more second servo heads each individually have a second track width greater than the first track width.

20. A tape drive comprising the tape head of claim 15.

* * * * *